United States Patent [19]
Comerford et al.

[11] Patent Number: 4,744,215
[45] Date of Patent: May 17, 1988

[54] ROCKET MOTORS HAVING DEEPLY SUBMERGED NOZZLES

[75] Inventors: William H. Comerford, Manassas, Va.; Morris S. Roth, Gaithersburg, Md.

[73] Assignee: Satellite Business Systems, McLean, Va.

[21] Appl. No.: 411,942

[22] Filed: Aug. 26, 1982

[51] Int. Cl.⁴ .......................... F02K 9/32; F02K 9/97
[52] U.S. Cl. ........................................ 60/253; 60/271
[58] Field of Search ............... 60/271, 253, 255, 201; 244/170, 135 R, 3.21, 3.23; 102/374

[56] References Cited

U.S. PATENT DOCUMENTS 2,884,859  5/1939  Alexander et al. .................. 60/253
3,110,318 11/1963  Eulitz ............................. 244/135 R
3,212,257 10/1965  Frey et al. ........................ 60/271
3,401,525  9/1968  Schubert et al. ................... 60/255
3,760,589  9/1973  Puckett et al. .................... 60/271

FOREIGN PATENT DOCUMENTS 53-13016  2/1978  Japan .............................. 60/256

Primary Examiner—Louis J. Casaregola
Attorney, Agent, or Firm—Pollock, Vande Sande & Priddy

[57] ABSTRACT

The present invention relates to reducing the tendency to mutate in solid fuel rocket motors, especially such motors which have deeply submerged nozzles. The invention comprises a series of baffles or beads for restraining the motion of trapped combustion products.

6 Claims, 2 Drawing Sheets

ROCKET MOTORS HAVING DEEPLY SUBMERGED NOZZLES

BACKGROUND ART

The production and use of solid fuel rocket motors is based on a well-developed body of theory and experience. One class of relatively small solid fuel rocket motors is used as apogee or perogee motors to increase the kinetic energy of a spacecraft from a relatively low lying orbit to a different, higher orbit. When fired, the spacecraft comprises the ultimate payload (a satellite, for example) plus at least the motor being fired. Typically, these types of solid fuel rocket motors are fired with the spacecraft in a spinning condition, for enhanced stability and thus the motor being fired is also spinning.

Over the last several years, several applications of one particular motor have illustrated a undesirable nutation of the motor during the actual firing, and even afterwards. Such nutation is generally undesirable for a number of reasons, not the least of which is that it tends to render the spacecraft unstable.

Although nutation is a relatively well-understood phenomenon, and techniques for its control are also well known, see for example U.S. Pat. Nos. 3,442,468; 3,728,900; 3,730,457; 3,737,118 and 3,915,416, those skilled in the art were (and to our knowledge still are) unable to identify the causes of this undesirable nutation and hence were unable to suggest corrections therefore. For example, the nutation control devices described in the referenced patents all require auxiliary apparatus to be located either within or without a spacecraft. While the addition of nutation control apparatus to a body which is to be ultimately placed in orbit has been accomplished, application of these solutions to a rocket motor do not appear feasible. Auxiliary apparatus located outside a rocket motor would merely degrade performance; and the environment within the rocket motor is too hostile for such apparatus, i.e. during firing the pressures within the motor are high, and temperatures are measured in thousands of degrees. Furthermore, since the cause of the nutation was unknown, the effect of such auxiliary apparatus was unknown.

The particular rocket motor within which this nutation was noticed included a relatively new feature related to the placement of the nozzle relative to the motor housing or shell, more particularly the nozzle was deeply submerged. Those skilled in the art are well aware that rocket motor performance is directly related to the length of the nozzle and hence relatively long nozzles are desirable. On the other hand, efforts to fit spacecraft within the cross-section of the Space Transportation System (hereinafter STS) require an effort at shortening the longitudinal extent of the spacecraft. Lengthening of the nozzle would require decreasing the length or longitudinal extent of the spacecraft or require a reduction in longitudinal extent of some other portion of the spacecraft. This problem was solved by lengthening the nozzle, but submerging it within the housing or shell of the rocket motor such that the extent of the nozzle exterior of the rocket motor was relatively short.

Through an analysis of telemetry data, we have come to the conclusion that the nutation exhibited by this rocket motor (particularly the STAR-48) is directly related to the deeply submerged nozzle, and is caused by trapping of combustion products, hereinafter termed slag, within the motor housing, but outboard of the deeply submerged nozzle. The data which leads us to this conclusion is primarily the sharp increase in nutation which is indicated just prior to termination of the motor burn. We believe this is indicative of the presence of slag for the following reason. During the motor burn, any mass within the motor is subject to two forces, a centrifugal force caused by reason of the spinning, and an acceleration force as a result of the rocket burn (i.e., the rocket thrust). During burn, the rocket thrust is very much greater than the centrifugal forces and causes the slag to remain in the annular region around the submerged nozzle at the base of the motor case. Furthermore, when there is no nutation and the body spins smoothly around the spin axis, the mass of the slag would be uniformly distributed around the annular ring due to the centrifugal force and the center of mass of the slag would lie on the spin axis. However, in the presence of nutation or in the presence of dynamic unbalance of the rest of the body, the centrifugal forces are modulated causing the mass of slag to be nonuniformly distributed about the spin axis, which in turn causes the center of mass of the slag to be offset to one side of the spin axis. When the center of mass of the slag is offset from the spin axis, which is the line of action of the thrust, a torque about the center of mass of the entire body is created in a direction perpendicular to the spin axis. This torque changes the nutation, either decreasing or increasing the nutation depending on the parameters of the system, primarily spin rate, inertia ratio, thrust, location of the center of mass, mass of the slag and body, and the geometry of the case. After termination of the rocket burn, the acceleration force is no longer present and the centrifugal force due to the motor spinning tends to push the slag radially outward from the axis of rotation and thus increase the moment of inertia of the slag. This is consistent with a decrease in nutation during burn, followed by a sharp increase in the nutation angle just prior to burn termination, followed by a very much smaller increase in nutation after termination of burn. The deeply submerged nozzle has a tendency to trap products of combustion which is not true of other nozzles. Once trapped, the slag cannot escape and its presence, and especially its movement in response to external forces, produces the undesirable nutation build-up.

SUMMARY OF THE INVENTION

Based on our conclusion that the large nutation angle is due to the unrestrained slag movement during thrusting, the solution to the problem is somehow restraining the slag so that it is restrained to lie at or near the base of the motor shell or housing, preferably as close to the spin axis as possible. Most importantly, the slag should be restrained so that it cannot rotate about the spin axis of the motor. In a preferred embodiment of the invention, the restraining device comprises a series of radially directed baffles, pairs of baffles form "pockets" to restrain the slag, particularly from rotating about the longitudinal axis of the motor. In order to minimize any shock or jerk, the baffles can be provided with one or a series of apertures to allow the slag to "leak" from one side of a baffle to the other. The size of the holes, as well as the number, determine the rate at which the slag can move from one pocket to the other.

In other embodiments of the invention, the restraining means comprises a series of parallel beads; a bead or a pair of the beads form a race. The beads are molded or formed into the inner surface of the shell and radiate outwardly from the intersection of the nozzle with the base of the shell. The race restrains the slag to flow circumferentially parallel to the longitudinal axis of the motor and thus restrain the slag from rotating about the axis of the motor.

Accordingly, in a preferred embodiment the invention provides an improved solid rocket motor of the type incorporating a submerged nozzle with reduced tendency to nutate comprising:

a shell, with a longitudinal axis, solid fuel contained within said shell, a nozzle extending through a hole in the shell, said nozzle including a submerged throat and located so that said longitudinal axis coincides with an axis of symmetry of said nozzle, and restraining means surrounding said throat of said nozzle restraining motion of products of combustion trapped within said shell.

BRIEF DESCRIPTION OF THE DRAWINGS

The present invention will now be further described in the following portions of this specification, when taken in conjunction with the attached drawings in which like reference characters identify identical apparatus and in which.

DETAILED DESCRIPTION OF PREFERRED EMBODIMENTS

Figure 1:
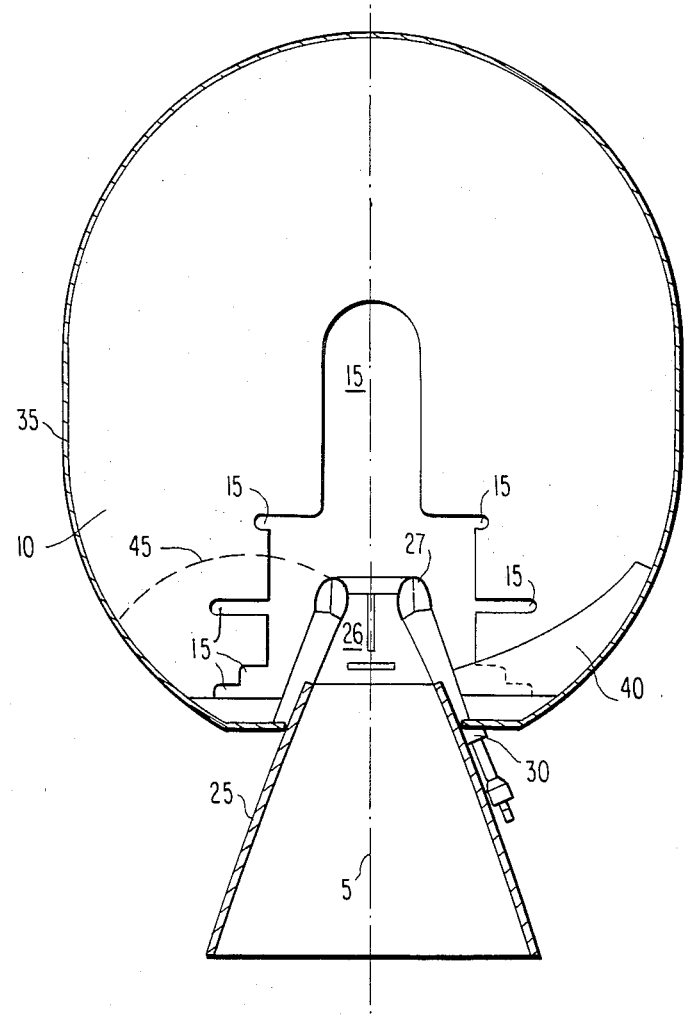
FIG. 1 is a cross-section of an improved rocket motor.

FIG. 1 is a cross-section showing, to the left of the axis 5, the STAR-48 rocket motor cross-section, and to the right of the axis 5, the same motor improved in accordance with the present invention.

More particularly, the motor itself includes an axis of symmetry 5, which is also its spin axis. The motor generally includes an outer shell or casing 35 (which is lined with an insulating liner, not seen in FIG. 1 but shown in FIG. 2). The casing 35 is filled with solid fuel 10 which is conventionally cut and shaped in the areas designeated 15. The casing 35, or more particularly one end thereof, has a hole in which is placed a nozzle 25. The axis of symmetry of the nozzle 25 coincides with the spin axis 5 of the motor. As shown in FIG. 1, the STAR-48 has a deeply submerged nozzle in that the throat of the nozzle 26 protrudes a substantial distance into the interior of the shell 35. Located about the periphery of the nozzle 25 is an igniter ring 27 which is fired from an igniter 30. Motor burn is initiated by firing the igniter plug 30 which ignites the igniter ring 27, which in turn ignites the solid fuel 10.

As was mentioned above, the deeply submerged throat of the nozzle 25 is a relatively new feature in solid fuel rocket motors. The cutting and shaping of the solid fuel 10 is arranged so that combustion proceeds relatively uniformly, and the products of combustion exit through the nozzle throat 26 and the nozzle 25, to provide thrust.

However, the deeply submerged nozzle allows a relatively low velocity region, bounded by the dotted line 45, the shell 35, and a wall of the nozzle 25. Although this dotted line 45 is only shown on the left, symmetry considerations make it evident that another low velocity exits on the right hand side of the axis 5. Our review of telemetry data from previous firings of the STAR-48 in space leads us to the conclusion that products of combustion (for example aluminum oxide) may very well be trapped in this low velocity region, and such trapped products of combustion will be hereinafter referred to as slag. Because of the temperature and pressure conditions interior of the shell 35 during motor burn, this slag is perhaps molten and at least viscous. During the course of the motor burn, the slag is subjected to two external forces, a centrifugal force by reason of the spinning of the motor, and an acceleration force. The acceleration force is of such magnitude that most of the slag will exist in a region directly adjacent a periphery of the nozzle 25. However, at termination of motor burn, the acceleration force is no longer present and the slag is only subjected to centrifugal forces. This results in a movement of the slag radially outwardly from the spin axis 5, increasing the moment of inertia. In addition, the slag tends to rotate about the spin axis 5 in synchronism with the nutation motion and our conclusion is that this motion of the slag is the cause of the nutation increase, which is particularly severe during burn.

This description of the left hand side of the cross-section in FIG. 1 represents the conventional STAR-48, or any other solid fuel motor with a deeply submerged nozzle.

To minimize motor nutation, we believe it is necessary to restrain this slag from spinning around the spin axis so that it cannot spin in synchronism with the nutation. In one embodiment of our invention, that device the restrain the slag is a series of baffles, such as baffle 40, shown in cross-section on the right hand side of FIG. 1. Preferably there are a series of baffles, each extending inwardly from an inner surface of the shell and directed radially outward from the longitudinal axis, so that each pair of baffles form a pocket for restraining a tendency of the slag to rotate about a longitudinal axis. While the number of the baffles 40 can be varied within relatively wide limits, we presently believe that six equally spaced baffles, spaced 60° apart about the axis 5 will suffice. As shown in FIG. 1, in order to restrain the slag, the baffle contour is arranged to match the contour of the shell 35, and the baffle is fixedly mounted so that it will not move relative to the shell 35.

Figure 2:
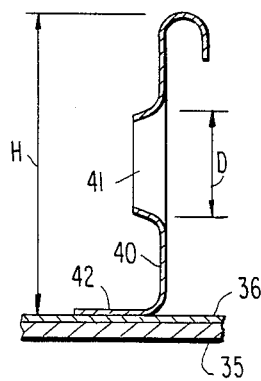
FIG. 2 is a cross-section of a baffle in accordance with one embodiment of the invention.

FIG. 2 is a cross-section of a typical baffle 40 and the adjacent region of the case 35. As shown in FIG. 2, located interior of the case 35 is an insulating liner 36. The barrier 40 can be made from a carbon-carbon material and molded as illustrated. To fix the baffle relative to the motor, it is secured using a suitable securing agent (epoxy for example). High temperature epoxies capable of withstanding temperatures in the range of 5000° are readily available to those skilled in the art.

The baffles shown in FIG. 2 includes a base region 42, parallel to the liner 36, which provides a surface area for securing baffle 40 to the liner 36. The remaining portion of the baffle 40 is generally perpendicular to the plane of the major dimension of the region 42 and extends up to a height H above the surface of the liner 36. The height H can be chosen to ensure that all or a majority of the "slag" is adequately restrained. An estimate of the mass of the slag can be made from the telemetry data, and assuming the slag is all or mostly aluminum oxide, by knowing the density, we have estimated that the totality of the slag occupies less than about a gallon in volume. More particularly, the volume lies somewhere between one quart and two gallons. This leads us to believe that the maximum height H of the baffle 40 can be six inches or less. As shown in FIG. 1, the height H of the baffle decreases in the radial direction, although that is not essential to the invention and, if desired, the baffle may have a constant height H.

FIG. 2 also illustrates that the baffle 40 includes an aperture 41 of diameter D. Although only a single aperture is shown in FIG. 2, it is within the scope of the invention to employ multiple apertures in the baffle as well as to eliminate the apertures entirely. The diameter D of the aperture (S), if used, is selected again based on the viscosity of the slag.

Figure 3:
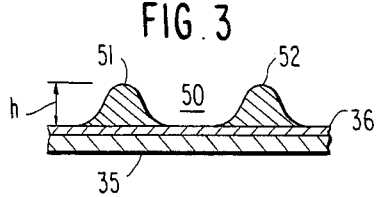

The embodiment of our invention shown in FIGS. 1 and 2 is particularly suitable as a retro fit to rocket motors already manufactured. Another embodiment of our invention, shown in connection with FIGS. 3 and 4, is more particularly suited to application during original manufacture of the motor.

Figure 4:
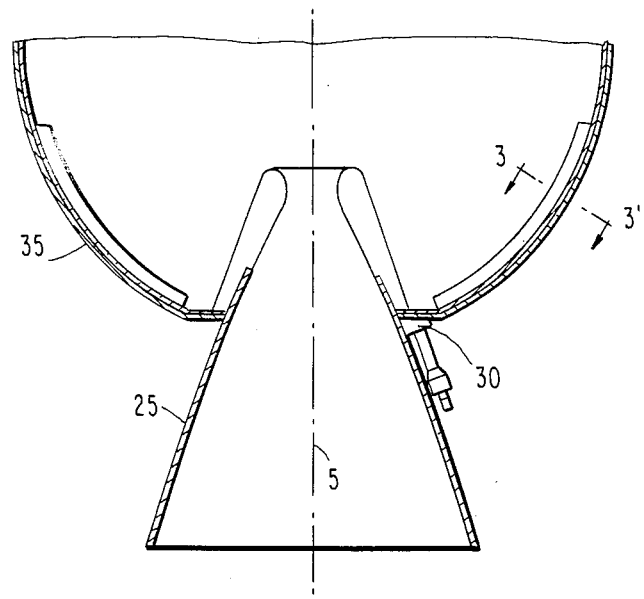
FIGS. 3 and 4 illustrate another embodiment, FIG. 4 comprising a section of a rocket motor illustrating placement of beads and FIG. 3 being a section of FIG. 4 along the line 3—3'.

FIG. 4 shows a partial cross-section of the motor shown in FIG. 1, omitting some of the details but showing the location of the nozzle 25 and the shell 35. FIG. 4 omits the baffles 40, in its stead a plurality of beads 51 are located above the liner 36. The beads radiate outwardly from the nozzle 25, conforming to the interior of the motor. FIG. 3 is a cross-section of FIG. 4 taken on the lines 3—3'. As shown in FIG. 3, the beads 51 and 52 (and the beads are paired to form a race 50) are welded or otherwise secured to the interior of the liner 36. A plurality of pairs of beads form a plurality of races 50, for example there may be six pairs of beads equally spaced 60° apart. The races restrain the slag's tendency to rotate about the axis 5. As thus restrained, the slag contribution to motor nutation is reduced or inhibited. The beads 51, 52 may be solid as shown in FIG. 3, or may be hollow bodies. The baffles or beads can be extended upward along the case wall beyond the equator of the case, to prevent the slag from adding to nutation after burnout as well as during motor burn. It is not essential to extend the baffles or beads in this manner since the major effects of the slag motion occur during burn. The height h of the beads above the surface of the liner 36 can be chosen in accordance with criteria already described. From the preceding, it should be apparent that the invention provides restraint for restraining tendency of the slag to rotate about the spin axis 5. Restraining or preventing this rotation will, of course, inhibit or minimize nutation of the motor. Although two specific embodiments of the invention have been described, those skilled in the art will, after reviewing this description, be capable of applying the principles of the invention to other different, but equivalent, structures. The scope of the invention is to be determined by the claims attached hereto.

I claim:

1. An improved solid rocket motor of the type incorporating a submerged nozzle with a reduced tendency to nutate comprising:
    a shell, with a longitudinal axis,
    solid fuel contained within said shell,
    a nozzle extending throught a hole in said shell, said nozzle including a submerged throat located so that said longitudinal axis coincides with an axis of symmetry of said nozzle, and
    restraining means surrounding said throat of said nozzle retraining motion of products of combustion trapped within said shell to inhibit rotation of said products of combustion about said longitudinal axis,
    wherein said restraining means comprises a series of baffles each extending inwardly from an inner surface of said shell and directed radially outward from said longitudianl axis to form pockets, each defined by a pair of baffles for restraining a tendency of said products of combustion to rotate about said longitudinal axis.

2. The rocket motor of claim 1 wherein said baffles includes at least one aperture.

3. An improved solid rocket motor of the type incorporating a submerged nozzle with a reduced tendency to nutate comprising:
    a shell, with a longitudinal axis,
    solid fuel contained within said shell,
    a nozzle extending through a hole in said shell, said nozzle including a submerged throat located so that said longitudinal axis coincides with an axis of symmetry of said nozzle, and
    restraining means surrounding said throat of said nozzle restraining motion of products of combustion trapped within said shell to inhibit rotation of said products of combustion about said longitudinal axis,
    wherein said restraining means comprises pairs of parallel beads radiating outwardly from said longitudinal axis, each pair of beads forming races to restrain a tendency of said products of combustion to rotate about said longitudinal axis.

4. An improved solid rocket motor of the type incorporating a submerged nozzle with a reduced tendency to nutate, comprising:
    a shell, with a longitudinal axis,
    solid fuel contained within said shell,
    a nozzle extending through a hole in said shell, said nozzle including a submerged throat located so that said longitudinal axis coincides with an axis of symmetry of said nozzle, and
    restraining means surrounding said throat of said nozzle, restraining motion of products of combustion trapped within said shell,
    said restraining means comprising a series of baffles each tentending inwardly from an inner surrace of said shell and directed radially outward from said longitudinal axis to form pockets, each defined by a pair of baffles for restraining a tendency of said products of combustion to rotate about said longitudinal axis.

5. The rocket motor of claim 4 wherein said baffles include at least one aperture.

6. An improved solid rocket motor of the type incorporating a submerged nozzle with a reduced tendency to nutate comprising:
    a shell, with a longitudinal axis,
    solid fuel contained within said shell,
    a nozzle extending throught a hole in said shell, said nozzle including a submerged throat located so that said longitudinal axis coincides with an axis of symmetry of said nozzle, and
    restraining means surrounding said throat of said nozzle, restraining motion of products of combustion trapped within said shell,
    said restraining means comprising pairs of parallel beads radiating outwardly from said longitudinal axis, each pair of beads forming races to restrain tendency of said products of combustion to rotate about said longitudinal axis.

\* \* \* \* \*